United States Patent [19]

Lepine et al.

[11] 3,999,437

[45] Dec. 28, 1976

[54] PNEUMATIC INDICATOR

[75] Inventors: Michel Lepine, Levallois-Perret; Daniel Bouteille, Marnes-la-Coquette; Pierre Hardouin, Asnieres, all of France

[73] Assignee: La Telemecanique Electrique, France

[22] Filed: Oct. 9, 1975

[21] Appl. No.: 621,180

[30] Foreign Application Priority Data

Oct. 17, 1974 France .......................... 74.34989

[52] U.S. Cl. .......................... 73/419; 116/114 PV

[51] Int. Cl.[2] .......................... G01L 7/16

[58] Field of Search .......................... 116/114 PV, DIG. 7, 116/63 P; 73/419, 406

[56] References Cited

UNITED STATES PATENTS

| | | | |
|---|---|---|---|
| 2,505,118 | 4/1950 | Holmes | 73/419 |
| 3,028,758 | 4/1962 | Passaggio | 73/419 |
| 3,221,704 | 12/1965 | Johannsen | 116/114 PV |

*Primary Examiner*—Donald O. Woodiel

*Attorney, Agent, or Firm*—William Anthony Drucker

[57] ABSTRACT

The invention relates to a pneumatic indicator comprising a member or body and a transparent window behind which a spherical pivoting moving body can assume two distinct positions visible from the outside when the end of a lever placed in the member transmits to a cavity of the moving body, either the movements of a membrane or of a piston under pressure action or the movements resulting from a restoring spring.

Such indicators are particularly used in equipment for monitoring the operation of an installation controlled by automatic pneumatic equipment or in industrial atmospheres where incandescent lamps cannot be used because of the explosion hazard.

3 Claims, 3 Drawing Figures

PNEUMATIC INDICATOR

The invention relates to a pneumatic indicator comprising a member and a transparent window behind which a spherical, pivoting, moving body can assume two distinct positions visible from the outside when the end of a lever placed in the member transmits to a cavity of the moving body either the movements of a membrane or of a piston under pressure action or the movements transmitted by a restoring spring.

Such indicators in particular used in equipment for monitoring the operation of an installation controlled by automatic pneumatic equipment or in industrial atmospheres where incandescent lamps cannot be used due to the explosion hazard.

Indicators of the fundamental type defined hereinbefore are for example known from British Patent 687,849. In this known apparatus, no account has been taken of the fact that the pivoting, moving body is subject to high mechanical stresses when it is required to assume each of these two stable states under the influence of the motive force.

The high accelerations occurring at these times are largely due to the geometry of the transmission system placed between the membrane and the pivoting moving body.

Therefore, the invention proposes to provide a pneumatic indicator of the type known from the prior art but wherein measures are taken to give the pivoting moving body a progressive movement so that it will no longer be subject to the harmful influence of accelerations occurring at the time when the change of state occurs.

According to the invention, this is achieved through the cavity having at least one groove whose median plane passes along the rotation axis and which extends from a first area adjacent to the cavity opening to a second area adjacent to the axis whilst the end of the lever has a pin which penetrates the groove and which during each movement of the lever passes from the first area into the second area and then returns to the first.

The progressive variation properties of the angular acceleration of the rotary moving body are advantageously improved if the angle formed for each extreme position between the plane of the groove and the plane passing through the pin and the pivoting axis of the lever is close to 90°.

An even better result is obtained if the precautions described hereinbefore are supplemented by the use of a constriction which only permits the passage of fluid to the membrane and back at a particular predetermined speed.

Figure 1:
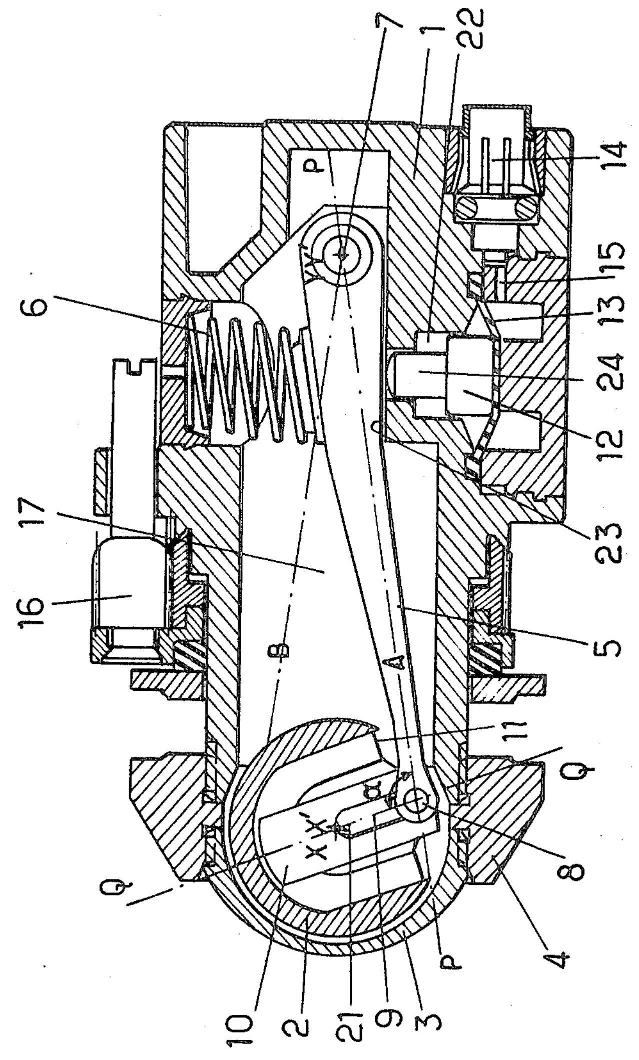
Figure 3:
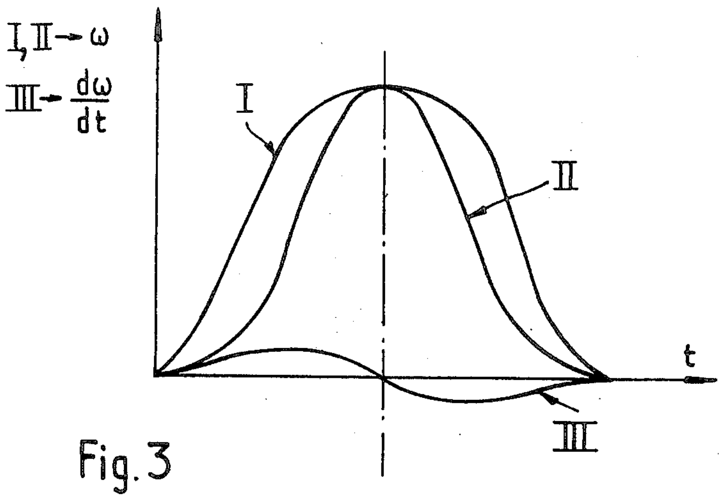
Figure 2:
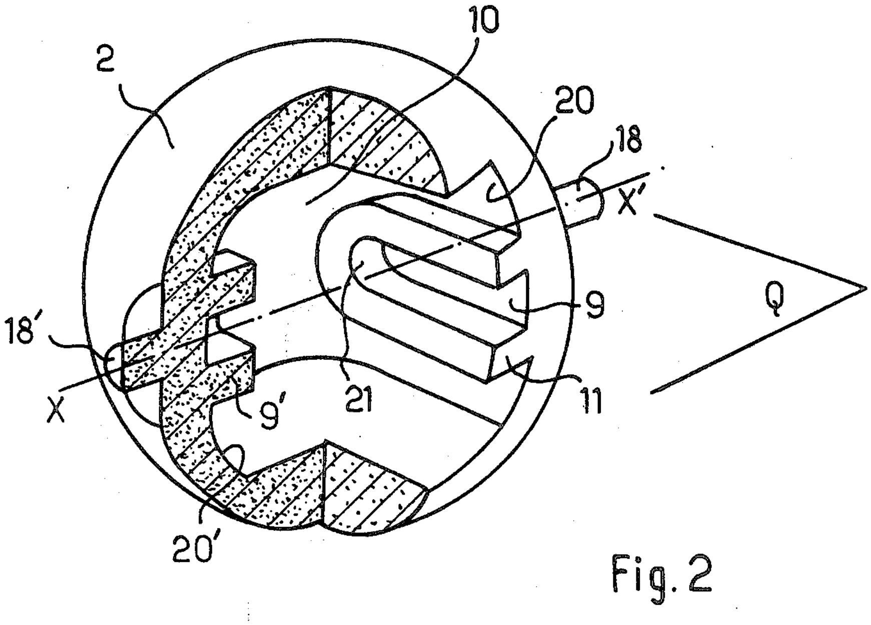

Other features and advantages will be better understood from the following description relative to the drawings wherein show:

FIG. 1 an axial section of the pneumatic indicator;

FIG. 2 a perspective view with a partial section of the pivoting moving body;

FIG. 3 the evolution of angular acceleration and speed of the pivoting moving body.

In FIG. 1, 1 is the indicator body which substantially comprises a first recess 17 which is opened towards the front of the apparatus and contains a lever 5 oscillating about a pointer 17 of axis YY' and a rotary moving body 2 having a generally spherical shape and which pivots about the two pins 18, 18' of common axis XX' (cf. FIG. 3).

This rotary moving body has a frontal surface representing about two thirds of the total surface area directed towards a transparent cap 3 which seals recess 17 by means of a retaining ring 4 which also serves to form a shoulder for fixing the apparatus via an opening in a not shown panel. A moving means 16 produces the gripping of the panel wall in order to ensure fixing.

Lever 5 has at its free end a pin 8 whose axis is parallel to the rotation axis XX'. Pin 8 and axis YY' are therefore located in the same plane P perpendicular to the plane of the drawing.

FIGS. 1 and 2 show the construction of the rotary moving body 2 which has a cavity 10 terminating at the outer surface. The two opposite walls 20, 20' of this cavity arranged perpendicular to rotation axis XX' materialized by two lateral pins 18, 18' whereby each of which has a groove 9, 9' respectively whose plane Q passes through the axis XX'.

Each of these grooves extends from a first area 11 adjacent to the cavity opening to a second area 21 adjacent to the XX' axis.

The width of these grooves is selected in such a way that the pin 8 can slide therein without appreciable friction after having been introduced therein to, as can be seen in FIG. 1.

In FIG. 1, lever 5 is located in the rest position A controlled by a restoring spring 6 placed in recess 17 which applies it against wall 23 of body 1.

A second recess 22 in the body receives a piston 12 whose end 24 traverses wall 23 facing lever 5. This piston is subject to the action of the first face of a membrane 13 whose second face is connected to a connecting orifice 14 a constriction 15. By means of a flexible tube, this orifice is connected to a pneumatic unit or an apparatus whereof it is desired to know one of the two possible states characterized by the absence or presence of pressure on orifice 14.

The operation consists solely of transforming the pressure present in 14 by a rotation of the moving body which displays one of the two frontal surface portions, whereby each of which has a different colour. Thus the pressure leads to the membrane being raised which brings about the rotation of the lever in the direction of the pointers counter to the restoring spring.

This rotation causes pin 8 to slide in groove 9, bringing about the rotation thereof until lever 5 can pivot no further because piston 12 abuts in position B.

In the movement described hereinbefore, lever 5 passes from the position A to a symmetrical position B relative to the plane passing through the axes XX' and YY' and the pin has moved from the first area 11 of groove 9 to a second area 21 thereof and then returned again to the first area.

On examining the geometry of the system shown, it can be seen that the transmission ratio between the angular movements of the lever and those of the pivoting moving body is variable.

It can be seen in FIG. 3 that the angular speed of the moving body slowly increases and then reaches a large value when the pin passes into the area adjacent to axis XX' and then decreases symmetrically.

Curve I shows the speed build-up $\omega$ when the angle $\alpha$ formed by the P and Q planes in the rest position is greater than 90°.

Curve II which corresponds to an angle of $\alpha$ equal to 90° that the angular acceleration build-up ($d\omega/dt$) communicated to the moving body as illustrated in curve III protects the latter from dangerous accelerations and shocks.

The progressive speed build-up of the moving body is further improved due to the presence of constriction 15 which ensures a less fierce application of pressure and negative pressure to membrane 13.

We claim:

1. A pneumatic indicator comprising: a housing having a transparent cover, an inner chamber, pressure responsive means and a gas inlet connected to said pressure responsive means; a spherical indicating body, rotatively mounted in said chamber in the vicinity of said cover about a rotation axis, between first and second positions, said spherical indicating body having cavity provided with an opening and having an inner portion provided with at least one groove extending from the said rotation axis to the said opening; a rocking lever mounted in said chamber and having a movable end; a pin located at said movable end and entering said groove, said lever being brought in motion and set in a working position by said pressure responsive means when a pressure is applied to said gas inlet; and resilient restoring means adapted to place said lever in a rest position when no pressure is applied at said gas inlet.

2. An indicator according to claim 1, wherein said pin has an axis and said lever has a rotation axis and wherein the angle formed in the first and second respective positions of the spherical indicating body between the plane passing through the rotation axis of the spherical indicating body and through the axis of the said pin and between the plane passing through the rotation axis of the said lever and through the axis of the said pin is about 90°.

3. A pneumatic indicator according to claim 1, wherein a throttling is placed between said pressure responsive means and said gas inlet.

* * * * *